(12) United States Patent
Yin

(10) Patent No.: US 6,820,138 B2
(45) Date of Patent: Nov. 16, 2004

(54) PORTABLE COMPUTER SYSTEM INCLUDING DETACHABLE HANDHELD MEDIA STORAGE AND PLAYBACK DEVICE

(75) Inventor: Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 352 days.

(21) Appl. No.: 09/888,976

(22) Filed: Jun. 22, 2001

(65) Prior Publication Data

US 2002/0199043 A1 Dec. 26, 2002

(51) Int. Cl.$^7$ ................................................ G06F 3/00
(52) U.S. Cl. ............................ 710/2; 710/62; 711/115; 381/74; 381/309
(58) Field of Search ............................ 711/115; 710/2, 710/62; 381/74, 309

(56) References Cited

U.S. PATENT DOCUMENTS

| | | | | |
|---|---|---|---|---|
| 5,904,652 A | * | 5/1999 | Gilbert et al. | ............... 600/447 |
| 5,918,163 A | * | 6/1999 | Rossi | ......................... 455/558 |
| 6,185,690 B1 | | 2/2001 | Cho | |
| 6,540,685 B1 | * | 4/2003 | Rhoads et al. | ............... 600/459 |
| 6,549,942 B1 | * | 4/2003 | Janky et al. | ................. 709/219 |
| 6,575,167 B1 | * | 6/2003 | McFadden | ................... 128/846 |
| 6,619,597 B1 | * | 9/2003 | Sheppard | ..................... 248/118 |

FOREIGN PATENT DOCUMENTS

| WO | WO 00/67261 | 11/2000 |
|---|---|---|
| WO | WO 00/75924 | 12/2000 |

* cited by examiner

*Primary Examiner*—Jeffrey Gaffin
*Assistant Examiner*—Eron Sorrell

(57) ABSTRACT

A portable computer system in accordance with one embodiment of a present invention includes a portable computer and a recorded media storage and playback device adapted to be electrically and mechanically connected to one another.

22 Claims, 4 Drawing Sheets

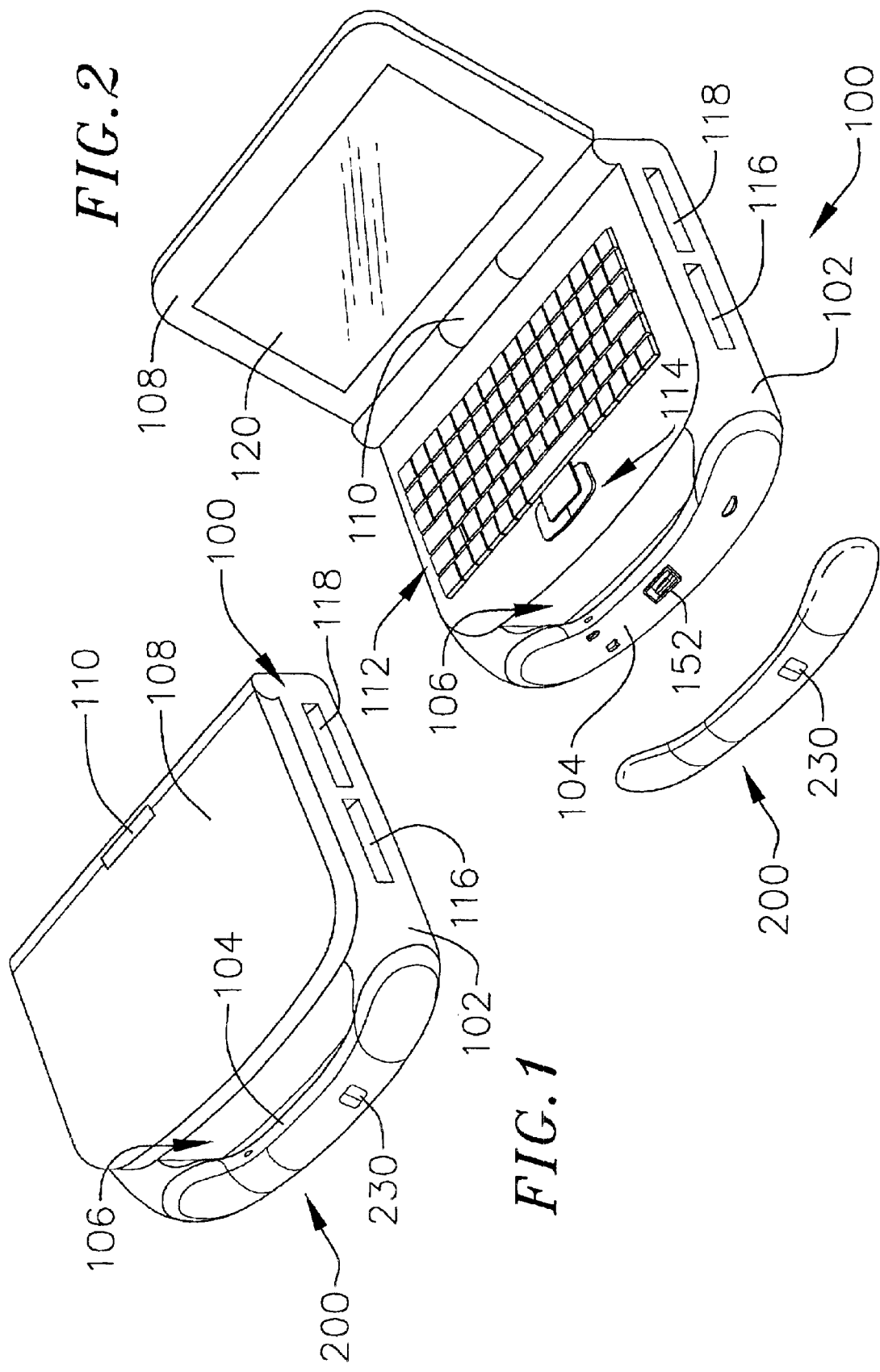

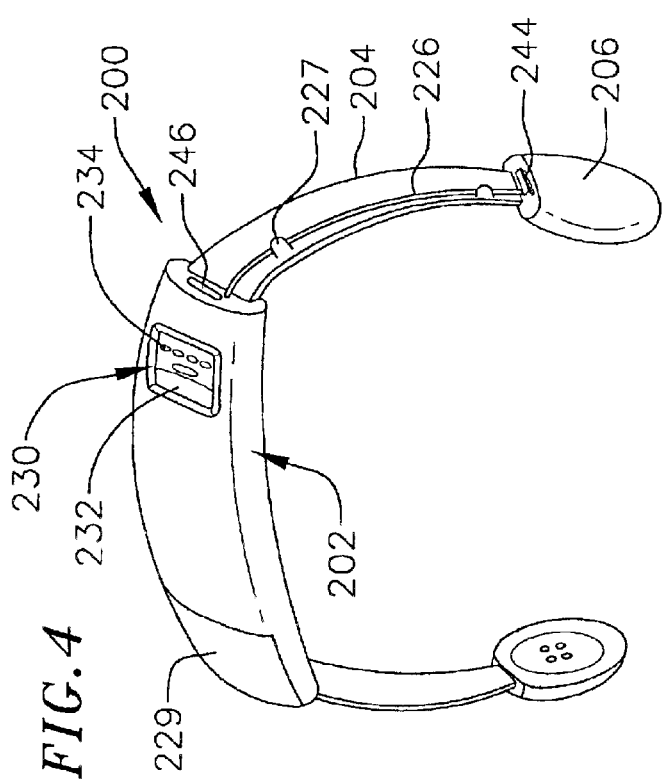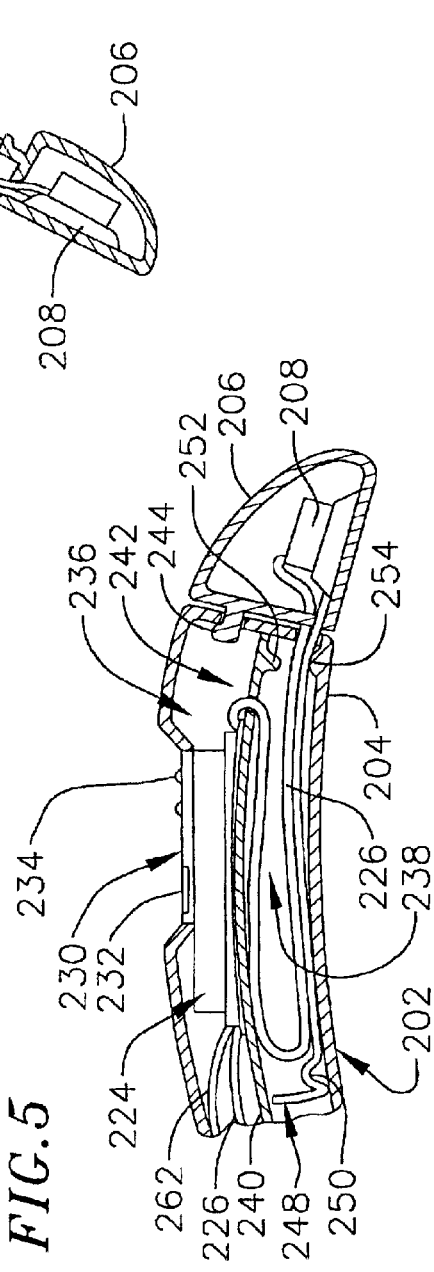

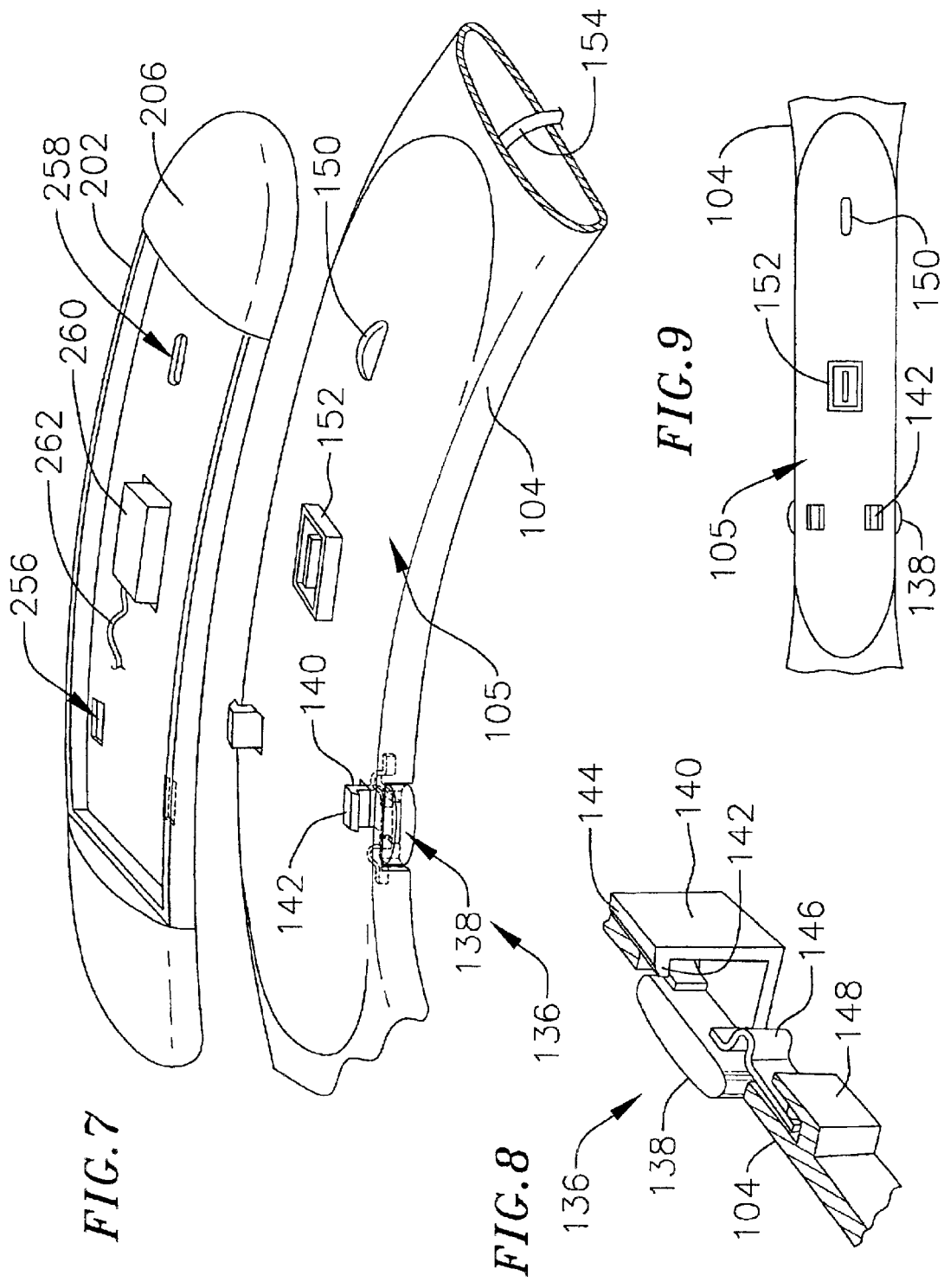

PORTABLE COMPUTER SYSTEM INCLUDING DETACHABLE HANDHELD MEDIA STORAGE AND PLAYBACK DEVICE

BACKGROUND OF THE INVENTIONS

1. Field of the Inventions

The present inventions are related to portable computers and media storage and playback devices.

2. Description of the Related Art

Audio data is frequently transmitted and stored in compressed (or "encoded") formats such as MP3 (i.e. the third audio layer of MPEG compression), Real Audio G2 and Microsoft Windows Media, while audio/video data is frequently transmitted and stored compressed formats such as, for example, MPEG and Real Video G2. One of the most popular methods of obtaining encoded data files, such as files that contain recorded musical works, is using the Internet to download the files onto a personal computer. The downloaded files are stored on the personal computer's hard drive (or other storage medium) and, when playback is desired, the files are retrieved from the hard drive and decompressed (or "decoded").

The relatively small size of these files has allowed users to transform their personal computers into musical jukeboxes. Nevertheless, the use and enjoyment of compressed audio and audio/video data files was originally somewhat inconvenient because personal computers are, for all practical purposes, immobile. More recently, portable handheld devices which are capable of storing compressed digital audio data and decompressing the data when playback is desired have become almost ubiquitous. Commercially available portable audio storage and playback devices include, for example, the Intel Pocket Concert Audio Player, the Sonicblue Rio 600 USB Blue, the Creative Labs Nomad, and the Sony NW-E3 Network Walkman. Similar audio/video devices are now also contemplated. Users can easily transfer the compressed data files from their personal computer to a portable playback device where it is stored in memory within the playback device. Typically, this is accomplished through use of an adapter cable that is connected to the personal computer and playback device. One common type of memory is flash memory, which can hold data permanently without being powered. Such memory may be located within the playback device itself, located within a small removable memory card that is plugged into the playback device, or both. Microdrives are another type of memory device that is now being considered for use in playback devices.

Storage space within the playback device memory is of course limited, as are the number of memory cards that a user can conveniently carry. Accordingly, users have been heretofore forced to select a limited number of data files for storage within the portable playback device and memory cards before leaving their personal computer.

BRIEF DESCRIPTION OF THE DRAWINGS

Detailed description of preferred embodiments of the inventions will be made with reference to the accompanying drawings. Certain aspects of the preferred embodiments have been eliminated from some of the views for clarity.

FIG. 1 is a perspective view of a portable computer system in accordance with a preferred embodiment of a present invention.

FIG. 2 is a perspective view of the portable computer system illustrated in FIG. 1 with the portable computer cover in the open position and the handheld media storage and playback device separated therefrom.

FIG. 4 is a perspective view of a handheld media storage and playback device in accordance with a preferred embodiment of a present invention.

FIG. 5 is a partial section view of a portion of the handheld media storage and playback device illustrated in FIG. 4.

FIG. 6 is another partial section view of a portion of the handheld media storage and playback device illustrated in FIG. 4.

FIG. 7 is a perspective view of various portions of the portable computer system illustrated in FIGS. 1 and 2.

FIG. 8 is a perspective view of a latch mechanism in accordance with a preferred embodiment of a present invention.

FIG. 9 is a top view of a portable computer handle in accordance with a preferred embodiment of a present invention.

DETAILED DESCRIPTION OF THE PREFERRED EMBODIMENTS

Figure 3:
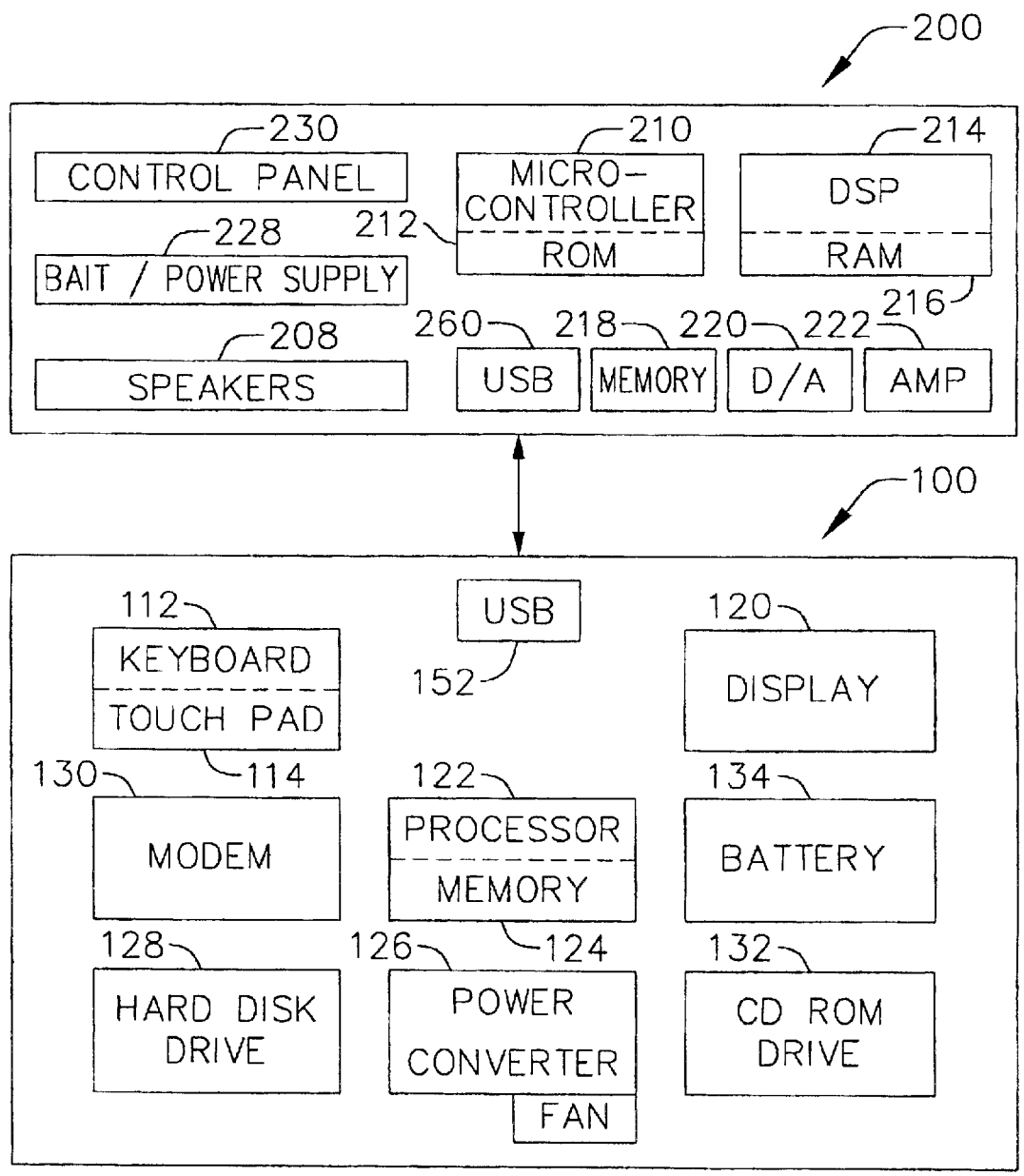
FIG. 3 is a block diagram showing various operating components of a portable computer and a handheld media storage and playback device in accordance with a preferred embodiment of a present invention.

The following is a detailed description of the best presently known modes of carrying out the inventions. This description is not to be taken in a limiting sense, but is made merely for the purpose of illustrating the general principles of the inventions. Additionally, it is noted that detailed discussions of various conventional internal operating components of portable computers and handheld media storage and playback device which are not pertinent to the present inventions have been omitted for the sake of simplicity.

As illustrated for example in FIGS. 1 and 2, a portable computer system in accordance with one embodiment of a present invention includes a portable computer 100 and a handheld media storage and playback device (or "playback device") 200 that may be removably mounted on, and electrically connected to, the portable computer. Although not limited to any particular style of portable computer, the exemplary portable computer 100 is preferably a notebook style computer including a main housing 102 that is approximately 13 inches wide, 10.5 inches long and 1.5 inches high. The main housing 102 is provided with a handle 104 that defines an open region 106 in which the user's fingers will rest when carrying the computer. The playback device 200 is removably mounted on the housing handle 104 in the illustrated embodiment. The playback device 200 and handle 104 are also respectively sized and shaped such that the playback device, when attached, will form part of the overall contour of the portable computer 100 and be relatively unnoticeable. The exemplary portable computer 100 and playback device 200, as well as the mechanical and electrical connections therebetween, are discussed in greater detail below.

Turning first to the portable computer aspect of the present inventions, the exemplary portable computer 100 illustrated in FIGS. 1 and 2 is, with respect to many of the structural and operating components, substantially similar to conventional portable computers such as the Hewlett-Packard Omnibook 6000 notebook PC. More specifically, the exemplary portable computer 100 includes structural components such as a display housing 108 that is pivotably connected to the main housing 102 by a hinge 110. A keyboard 112 and a dual pointing device 114 (i.e. touch pad and pointer) are mounted on the exterior of the main housing 102. The main housing 102 also includes a module bay 116 for optional modules such as a 3.5 inch disk drive module, a CD-ROM drive module or a ZIP drive module, and a battery bay 118. In addition to supporting a display 120, the display housing 108 also acts as a lid to cover the keyboard 112 and dual pointing device 114 when in the closed position (FIG. 1). To that end, a conventional latch arrangement (not shown) may be provided to lock the free end of the display housing 108 to the main housing 102 and maintain the display housing in the closed position.

As illustrated in block diagram form in FIG. 3, the operating components of the exemplary portable computer 100 include a processor 122, cache and RAM memory 124, a power adapter and fan arrangement 126, a hard disk drive 128 and a modem 130. A CD-ROM drive module 132 is positioned within the module bay 116 and a battery 134 is positioned within the battery bay 118 in the exemplary component configuration. The exemplary portable computer 100 may also include other conventional operating components such as, for example, audio and video cards, headphone and microphone ports, a serial port, a parallel port, keyboard and mouse ports, a 240-pin PCI connector for docking, an operating system such as Microsoft® Windows, and various application programs such a word processing and media playback.

Turning to the exemplary handheld media storage and playback device 200, it should initially be noted that the descriptive term "handheld" is used herein only as an indication of size, i.e. small enough to be carried with a human hand. Although the playback device 200 may be configured to fit comfortably in the palm of the hand, it may also be configured to be attached to a belt or other article of clothing. In the illustrated embodiment, the playback device 200 is, as is discussed in greater detail below, configured to be worn on the user's head like a pair of headphones.

As illustrated for example in FIGS. 4–6, the exemplary playback device 200 includes a main housing 202 and a pair of slidable arms 204 that support a pair of speaker housings 206 as well as the speakers 208 mounted therein. The slidable arms 204, which are preferably formed from pre-shaped flexible metal or plastic that facilitates a firm fit on the user's head, are slidable between the use position illustrated in FIGS. 4 and 6 and the storage position illustrated in FIGS. 1, 2 and 5. The exemplary main housing 202 is approximately 5 inches long, 1.5 inches wide and 0.5 inch high.

Although not so limited, the exemplary playback device 200 is a digital audio player that includes many of the electronic components found in conventional digital audio players. Referring to FIGS. 3–6, such components include a microcontroller 210, ROM 212 (which stores instruction sets and other files used by the microcontroller), a digital signal processor 214, RAM 216 (which stores decoding and audio data files during the decoding processes), memory 218 (such as fixed or removable flash memory or a microdrive for storing audio data in encoded form), a D/A converter 220 and an amplifier 222, all of which are positioned on a printed circuit board 224. The speakers 208 are connected to the amplifier 222 by speaker wires 226 that may be secured to the slidable arms with tabs 227. A battery/power supply arrangement 228 and control panel 230 are also provided. Access to the battery (or batteries) may be obtained by way of a removable cover 229. The control panel 230 includes an LCD 232 and a series of buttons 234.

The aforementioned electronic components function in conventional digital audio player fashion. For example, the microcontroller 210 controls the overall operation of the exemplary playback device 200 and the digital signal processor 214 decodes audio data files stored in the memory 218 and transmits the decoded digital data to the D/A converter 220. Analog signals from the D/A converter 220 are amplified by the amplifier 222 on their way the speakers 208. The LCD 232 may be used to, for example, display a list of data files stored in the memory 218, status information such as battery level, and the functions currently being performed through operation of the buttons 234. Those functions may include conventional playback device functions such as on/off, play/stop, skip-forward/skip-reverse, scroll, repeat, shuffle, etc.

Referring more specifically to FIGS. 4–6, the exemplary main housing 202 is divided into an upper portion 236 and a lower portion 238 by a partition 240. The printed circuit board 224 and control panel 230 are located within the upper portion 236 and the partition 240 includes a pair of wire apertures 242 through which the speaker wires 226 extend. The slidable arms 204 and speaker wires 226 may be stored within the lower portion 238 when the exemplary playback device 200 is not in use. Rounded tabs 244, which are mounted on the speaker housings 206, may be used to releasably lock the speaker housing in the storage position (FIG. 5) when urged through housing apertures 246. The exemplary slidable arms 204 may also be releasably locked in the use position (FIG. 6) by a flexible lever and protuberance arrangement. More specifically, the end of each slidable arm 204 includes a flexible lever 248 and an indentation 250, while the main housing lower portion 238 includes a pair of protuberances 252 and 254. The flexible lever 248 will snap over protuberance 252 and the indentation 250 will mate with protuberance 254 when the slidable arms 204 are pulled by the user to the use position, thereby locking the arms in place. This flexibility also allows the user to urge the lever 248 back over the protuberance 252 when returning the slidable arms 204 to the storage position.

As noted above, the exemplary portable computer 100 and playback device 200 may be removably connected to one another both mechanically and electrically. Turning first to the mechanical connection, the portable computer housing 102 is connected to the playback device housing 202 in the illustrated embodiment. More specifically, and as illustrated for example in FIGS. 7–9, the portable computer handle 104 includes a surface 105 that is shaped and sized so as to correspond to the bottom surface of the playback device 200. The playback device 200 is secured to the handle surface 105 in the exemplary implementation with a pair of handle latch mechanisms 136 that mate with apertures 256 on the bottom of playback device housing 202. Each latch mechanism 136 consists of a button 138 which is connected to a latch 140 having a hook 142 with a cam surface 144. The latch 140 is biased into the lock position by a pair of springs 146 that are held by slots 148. The handle 104 is also provided with an alignment pin 150 that mates with an alignment aperture 258 on the playback device housing 202.

When the playback device 200 is placed against the handle 104, the cam surfaces 144 will cause each latch 140 to move against the biasing force of the springs 146 to their respective unlock positions, thereby aligning the hooks 142 with the corresponding housing apertures 256. The hooks 142 will then enter the housing apertures 256 and, once inside, each of the latches 140 will be urged by the springs 144 to their respective lock positions. The playback device 200 may be released from the handle 104 by simply depressing the buttons 138 with enough force to overcome the biasing force of the springs 146 and align the hooks 142 with the apertures 256.

With respect to the electrical connection in the exemplary embodiment, the portable computer 100 and playback device 200 are adapted to electrically connect to one another when the playback device is mounted on the portable computer in the manner illustrated in FIG. 2. Such connection facilitates, for example, the transfer of compressed data files from the portable computer 100 to the playback device 200. To that end, the portable computer 100 and playback device 200 may include electrical connectors that will be aligned with one another when the playback device is mounted on the portable computer. In the preferred implementation illustrated in FIGS. 1–9, the electrical connectors consist of a male USB connector 152 on the handle 104 and a female USB connector 260 on the playback device 200. The male USB connector 152 is connected to the processor 122 (FIG. 3) by an appropriate cable 154, while the female USB connector from the housing lower portion 238, through one of the wire apertures 242, and into the housing upper portion 236. The female USB connector 260 will be flanked by the flexible levers 248 when the slidable arms 204 are in their respective storage positions.

Although the present inventions have been described in terms of the preferred embodiments above, numerous modifications and/or additions to the above-described preferred embodiments would be readily apparent to one skilled in the art.

By way of example, but not limitation, the playback device and portable computer may be configured such that the playback device can be mounted on a portion of the computer housing other than the handle. In such an embodiment, the portable computer may be provided without a handle if desired.

The playback device may also be provided with a built-in rechargeable battery and the portable computer may be provided with a charging power supply and connectors that will mate with corresponding connectors on the playback device and recharge the rechargeable battery when the playback device is mounted on the portable computer.

The playback device may also be in the form of a module that can be inserted into a module bay in the portable computer. Here, the playback device would not necessarily include the integral speaker/headphone arrangement described above and, instead, could simply include a port into which conventional headphones are plugged during use.

The playback device may also be another type of recording and playback device such a dictating device with a microphone. Here, recorded speech could be uploaded to the portable computer by way of the electrical connectors and converted into text by an appropriate speech recognition program.

The above-described latch arrangement may be rearranged such that the latch is associated with the playback device and the apertures are associated with the computer. Other types of connection devices may also be employed in place of, or in combination with, the latch arrangement.

It is intended that the scope of the present inventions extend to all such modifications and/or additions.

I claim:

1. A system, comprising:
a portable computer including a keyboard, a display, a housing, a computer electrical connector and a computer mechanical connector; and
a recorded media storage and playback device including a housing defining an exterior, a speaker, a user-manipulatable playback control element associated with the exterior of the housing, a storage and playback device electrical connector configured to mate with the computer electrical connector and a storage and playback device mechanical connector configured to mate with the computer mechanical connector;
the computer electrical connector, computer mechanical connector, storage and playback device electrical connector and storage and playback device mechanical connector being arranged such that the computer electrical connector will mate with the storage and playback device electrical connector when the computer mechanical connector mates with the storage and playback device mechanical connector.

2. A system as claimed in claim 1, wherein the computer electrical connector and the storage and playback device electrical connector comprise USB connectors.

3. A system as claimed in claim 1, wherein the portable computer housing includes a first housing portion and a second housing portion pivotable relative to the first housing portion between an open position and a closed position.

4. A system as claimed in claim 3, wherein the keyboard is mounted on the first housing portion and the display is mounted on the second housing portion.

5. A system as claimed in claim 1, wherein the recorded media storage and playback device comprises a digital storage medium and a digital decoder.

6. A system as claimed in claim 1, wherein the at least one speaker comprises a pair of speakers and the speakers are movable between respective storage positions and use positions.

7. A system as claimed in claim 1, wherein computer mechanical connector comprises a latch and the storage and playback device mechanical connector comprises a latch aperture.

8. A system as claimed in claim 1, wherein the computer housing is connected to the storage and playback device housing when the computer mechanical connector mates with the storage and playback device mechanical connector.

9. A system as claimed in claim 1, wherein the user-manipulatable playback control element comprises a button.

10. A system as claimed in claim 1, wherein the user-manipulatable playback control element is associated with a control panel.

11. A system as claimed in claim 10, wherein the control panel includes a display.

12. A system, comprising:
a portable computer including a keyboard, a display, a housing with a handle, a computer electrical connector on the handle and a computer mechanical connector on the handle; and
a recorded media storage and playback device including a housing, a speaker, a storage and playback device electrical connector configured to mate with the computer electrical connector and a storage and playback device mechanical connector configured to mate with the computer mechanical connector;
the computer electrical connector, computer mechanical connector, storage and playback device electrical connector and storage and playback device mechanical connector being arranged such that the computer electrical connector will mate with the storage and playback device electrical connector when the computer mechanical connector mates with the storage and playback device mechanical connector.

13. A system as claimed in claim 12, wherein the computer housing handle defines a portion of an overall device handle and the storage and playback device defines a remainder of the overall device handle.

14. A portable recorded media storage and playback device for use with a portable computer having a computer mechanical connector and a computer electrical connector, the portable media recording and playback device comprising:

a housing;

a pair of speakers;

a pair of slidable arms on which the speakers are respectively mounted, the slidable arms being movable between respective storage positions substantially within the housing and respective use positions substantially outside the housing;

the housing, pair of speakers and slidable arms together being sized, shaped and arranged to be worn on a user's head with the speakers facing respective ears when the arms are in the use positions;

a storage and playback device electrical connector configured to mate with the computer electrical connector; and a storage and playback device mechanical connector configured to mate with the computer mechanical connector;

the storage and playback device electrical connector and storage and playback device mechanical connector being arranged such that the computer electrical connector will mate with the storage and playback device electrical connector when the computer mechanical connector mates with the storage and playback device mechanical connector.

15. A portable recorded media storage and playback device as claimed in claim 14, wherein the slidable arms are flexible, have a preset curvature and, when in the use positions, extend substantially perpendicularly from the housing.

16. A portable recorded media storage and playback device as claimed in claim 14, wherein the housing comprises first side and a second side opposite the first and the storage and playback device electrical connector is associated with the first side, the device further comprising:

a control panel associated with the second side of the housing.

17. A portable recorded media storage and playback device as claimed in claim 14, wherein the storage and playback device mechanical connector comprises at least one housing aperture.

18. A system, comprising:

a portable computer including a housing that defines an exterior, a front end that faces in a forward direction and a rear end, a keyboard, a display that faces in the forward direction, and a computer electrical connector that faces in the forward direction; and a recorded media storage and playback device including a housing, a speaker and a media storage and playback device electrical connector;

the portable computer and recorded media storage and playback device being respectively configured such that the recorded media storage and playback device is fixedly mountable on the exterior of the portable computer housing and, when so mounted, the computer electrical connector that faces in the forward direction will mate with the media storage and playback device electrical connector.

19. A system as claimed in claim 18, wherein the portable computer housing includes a latch and the recorded media storage and playback device includes a corresponding latch aperture.

20. A system as claimed in claim 18, wherein the computer housing includes a handle and the computer electrical connector is associated with the handle.

21. A system as claimed in claim 18, wherein the recorded media storage and playback device comprises a digital storage medium and a digital decoder.

22. A system, comprising:

a portable computer including a main housing having a handle, a display housing pivotable relative to the main housing between an open position and a closed position, a keyboard associated with the main housing, a display associated with the display housing, a computer electrical connector mounted on the handle and a computer latch device mounted on the handle; and a recorded media storage and playback device including a housing, a digital storage medium, a pair of arms movable between respective storage positions substantially within the housing and respective use positions substantially outside the housing, a pair of speakers mounted on the arms, a storage and playback device electrical connector configured to mate with the computer electrical connector and a housing aperture configured to mate with the computer latch device;

the computer electrical connector, computer latch device, storage and playback device electrical connector and storage and playback housing aperture being arranged such that the computer electrical connector will mate with the storage and playback device electrical connector when the computer latch device mates with the storage and playback device housing aperture.

* * * * *